Figure 1:
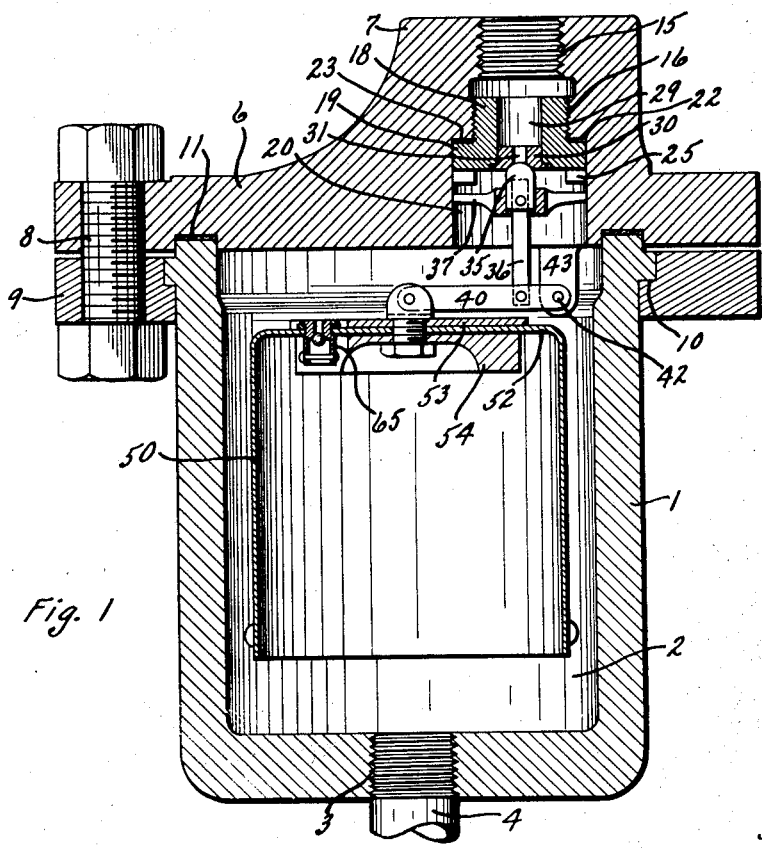

July 18, 1933.    L. P. STRONG    1,918,435

STEAM TRAP

Filed March 14, 1931

INVENTOR
Leslie P. Strong

BY

Brockett, Hyde, Higley & Meyer
ATTORNEYS

Patented July 18, 1933

1,918,435

UNITED STATES PATENT OFFICE

LESLIE P. STRONG, OF LAKEWOOD, OHIO, ASSIGNOR TO THE CLARK MANUFACTURING COMPANY, OF CLEVELAND, OHIO, A CORPORATION OF OHIO

STEAM TRAP

Application filed March 14, 1931. Serial No. 522,586.

This invention relates to improvements in inverted bucket steam traps, such as are used with steam containing appliances for removing therefrom air and water of condensation. More particularly, the present invention relates to improvements in the vent means of the inverted buckets of such traps.

In present-day inverted bucket steam traps, it is the practice to provide the trap bucket and more particularly, its top wall, with a small vent orifice, upwardly through which passes into the top portion of the trap chamber any air which may be within the trap bucket. Some of the steam within the trap bucket also passes out through this vent orifice, but the chief function of said orifice is to permit the escape from the trap bucket of the air therein.

Inasmuch as the inverted trap bucket is buoyed or maintained in an elevated position by the pressure of the air and/or steam within said bucket, it follows that escape of air (and, of course, steam) from said bucket through its vent orifice effects a reduction in the buoyant effect upon said bucket. Reduction of this buoyant effect upon the bucket in time causes said bucket to fall, with consequent opening of the trap outlet valve which is actuated by the rise and fall of said bucket. Due to the fact that the vent orifice of the bucket is quite small and hence the rate of escape of air and steam therethrough very low, said bucket does not fall very far until the buoyant effect thereon is increased sufficiently to return said bucket to its fully elevated position, with consequent complete closing of the trap outlet valve, said increase being effected by the steam and/or air remaining within the trap bucket, aided by steam and/or air which may just have entered the trap chamber and hence the trap bucket.

The result is that the trap bucket is always more or less in a balanced condition, that is, the weight of said bucket is normally opposed by sufficient steam and/or air pressure to maintain said bucket in an elevated position. The bucket frequently falls, but the fall is of slight extent and the bucket is almost immediately returned to its fully elevated position, with consequent complete closing of the trap outlet. The trap outlet is therefore frequently opened, but the opening of said outlet is of slight extent, and of extremely short duration, so that little water and/or air are permitted to be discharged at any one time.

These traps may, therefore, be said to be "continuously operating" traps, for they are almost continuously discharging some water and/or air. Such more or less continuous operation is necessary if the steam containing appliance to which the trap is connected is to be substantially completely freed of its water and/or air, since the trap discharges at any one time a comparatively small amount of water and/or air.

It is the general object of the present invention to provide an improved inverted bucket steam trap so constructed and having such an operation that its outlet is periodically opened, to such an extent and for such a prolonged duration, that an appreciable portion of the water and/or air in the trap chamber can be discharged therefrom. With such a substantial discharge upon each opening of the trap outlet, it is obvious that said outlet need be opened only periodically. The present improved trap is, therefore, an "intermittently operating" trap.

More specifically, the object of the present invention is the provision of an inverted bucket steam strap having its bucket provided with improved vent means for controlling the escape from the trap bucket of air and steam therein. Said improved bucket vent means comprises a simple vent orifice in the top wall of said bucket, said orifice being normally almost completely closed by suitable means, such as a ball valve, positioned below said orifice. By not completely closing said orifice, a small vent, in the form of a small leak port, is at all times provided in the top wall of the bucket for the slow escape from the bucket of steam and air therein. The ball valve is of such weight that it is normally held up against its seat, in closing position with respect to the bucket vent orifice, by the pressure of the air and/or steam within the trap bucket. Inasmuch as the air, and some of the steam, within the trap bucket is constantly escaping from said bucket through the small leak port which is always open, the steam and/or air pressure within the trap bucket is constantly being reduced. In time, this steam and/or air pressure is reduced to such an extent that it is insufficient to maintain the ball valve elevated against its seat, in closing position with respect to the bucket vent orifice. Said ball valve thereupon falls, with consequent complete uncovering or opening of the bucket vent orfiice. The air within the bucket and some steam immediately rush out of the trap bucket through its now completely open orifice, with the result that almost immediately there is insufficient steam and/or air pressure within the bucket to maintain said bucket in an elevated position. Said bucket thereupon falls, to its maximum extent, with consequent full opening of the trap outlet. A material discharge of water and air from the trap is thereupon brought about.

After such a substantial discharge of water and/or air from the trap, the incoming steam forces the ball valve up against its seat, with consequent almost complete closing of the bucket vent orifice, and the bucket is raised by said incoming steam to its elevated position, with consequent complete closing of the trap outlet. Since a substantial amount of water and/or air is discharged from the trap each time the trap bucket falls, it follows that said bucket need not and does not fall frequently, so that intermittent trap operation results.

Figure 2:
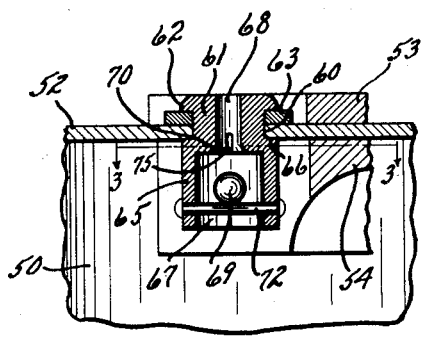
Figure 3:
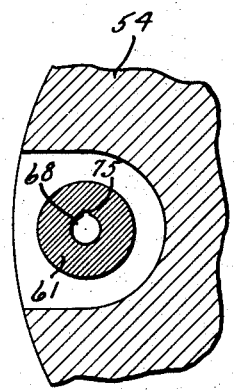

The present invention will be more readily understood, and further features of which will be apparent, from the following description thereof, reference being had to the accompanying drawing in which Fig. 1 is a vertical sectional view of the present improved steam trap; Fig. 2 is an enlarged vertical sectional view of the improved vent means of the present trap bucket; and Fig. 3 is a detail cross sectional view of said vent means on the line 3—3, Fig. 2.

The trap illustrated includes a generally cup-shaped metal casing 1, open at its top and having a generally cylindrical chamber 2 into which steam, water of condensation and air enter through the centrally disposed bottom inlet opening 3. Threaded or otherwise suitably secured in said opening is an inlet pipe 4 connected to the steam containing appliance from which the present trap is intended to remove water of condensation and air.

The chamber 2 of the trap casing is closed at the top by a metal cover 6 of generally circular shape in plan view and provided with a slightly off-center, generally cylindrical upright extension 7, preferably integral with the cover. The marginal portion of said cover is bolted or otherwise suitably connected, as at 8, to a horizontally disposed annular metal flange 9 shrunk upon or otherwise suitably secured to the top of the trap casing 1, said casing at its top and said flange having annular interlocking shoulders 10. For sealing purposes, an annular gasket 11 is preferably interposed between the cover 6 and the top of the trap casing.

The cover 6 and the cover extension 7 are together provided with a vertically disposed through-passageway, the upper and smallest portion 15 of which is threaded to receive the trap discharge or outlet pipe (not shown). The intermediate portion 16 of said passageway is also threaded and has secured therein the upper end portion 18 of a hard metal bushing, the lower enlarged end portion 19 of which lies within the lower, enlarged and unthreaded portion 20 of said cover and cover extension passageway. Said bushing is screwed up into said passageway until the upper annular surface of its lower enlarged end portion 19 engages the annular shoulder 22 formed by the enlargement of said cover and cover extension passageway. If desired, an annular sealing gasket 23 may be interposed between said cover shoulder 22 and the enlarged lower end portion 19 of said bushing, all as clearly shown in Fig. 1. For imparting rotary movement to said bushing in said cover and cover extension passageway, the lower enlarged end portion 19 of said bushing is provided with opposed lugs 25 depending from the bottom thereof.

Shrunk into or otherwise suitably secured in the lower end of a vertically disposed passageway 29 in said bushing is an exceptionally hard metal valve seat member 30 having a centrally disposed, vertically extending opening 31 therethrough. This opening 31 constitutes the outlet opening of the trap and through which, therefore, pass the water and air discharged from the trap.

This trap outlet opening 31 is controlled by a suitable valve 35 pinned or otherwise suitably mounted upon the upper end of a generally vertically disposed valve stem 36. For guiding said valve in its vertical movement within the lower, unthreaded portion 20 of the cover and cover extension passageway, into and out of engagement with the valve seat member 30, suitable guide means is provided in said portion 20, said means having a central portion through an opening in which said valve passes and radially extending arm portions 37.

The lower end of the valve stem 36 is pinned or otherwise suitably connected to a lever 40, intermediate the ends of said lever, said lever being arranged in generally horizontal position at the top of the trap chamber 2. The outer end of said lever is pivotally mounted at 42 to a casing lug 43 arranged within the trap chamber 2 at the top thereof, while the inner end of said lever, which end terminates substantially at the central axis of the trap, has suitably mounted thereon an inverted bucket 50, the movement of which in the trap chamber 2 controls the movement of the valve 35 and hence the opening and closing of the trap outlet opening 31. The connection of said lever 40 to said bucket is at substantially the center of the top wall 52 of said bucket and to make this connection a firm one and to give said bucket the desired weight, a metal disk 53 and a generally circular block 54 are respectively arranged above and below the top wall 52 of said bucket, as clearly shown in Fig. 1.

To permit air within the inverted trap bucket 50 to escape therefrom into the top portion of the trap chamber 2, the marginal portion of the top wall 52 of said bucket is provided with a vent aperture 60. Simple apertures of this kind constitute the vent means for the inverted buckets of practically all steam traps now on the market, but in the present trap, suitable valve means is provided for controlling the flow of air (and, of course, steam) through the bucket aperture 60 from the space within said bucket.

In the present embodiment of the invention, the upper tubular stem portion 61 of a metal valve housing is suitably secured within said aperture 60, such as by beading the upper end of said stem portion outwardly, as at 62, over the bucket top wall 52, or, as shown, over a metal washer 63 surrounding said stem portion and lying on said bucket top wall. Said valve housing is provided with an inverted cup-shaped body portion 65 lying within the space within the trap bucket, the annular shoulder 66 of said housing body portion engaging the inner surface of the bucket top wall 52. The chamber 67 within said valve housing body portion is open at its bottom and therefore is in communication with the space within the trap bucket. At its top, said valve housing chamber 67 communicates with the slightly enlarged lower end of a vertically disposed passageway 68 extending through the valve housing stem portion 61, the open upper end of said passageway being in communication with the top portion of the trap chamber 2.

Arranged within the chamber 67 of the valve housing body portion 65 is a suitable ball valve 69, of metal or the like, and adapted to almost completely close and open the lower enlarged end of the passageway 68 of said valve housing stem portion, a tapered annular valve seat 70 being provided at the lower end of said passageway for engagement by said ball valve. To confine said ball valve within said housing chamber 67, a suitable pin 72 extends across the lower end of said chamber, the ends of said pin being mounted in suitable openings in the cylindrical wall of the valve housing body portion 65.

As clearly indicated in the drawing, the metal disk 53 and the metal block 54 respectively arranged above and below the top wall 52 of the trap bucket are cut away adjacent the aperture 60 in said wall, thereby enabling the valve housing to be more easily and conveniently mounted in said aperture.

So long as there is sufficient steam and/or air pressure within the trap bucket to maintain said bucket in fully elevated position, such as shown in Fig. 1, the ball valve 69 will be maintained by said pressure up against its seat 70, in closing position with respect to the valve housing passageway 68. To permit the escape of a small quantity of air and/or steam at all times from within the trap bucket, a small leak groove 75 is provided in the valve seat 70. Therefore, even when the ball valve 69 is up against its seat, in closing position with respect to the valve housing passageway 68, a small vent is provided for the slow escape into the top portion of the trap chamber 2 of air and/or steam within the trap bucket. As before mentioned, the ball valve 69 is normally held up against its seat 70, in closing position with respect to the valve housing passageway 68, by the steam and/or air pressure within the trap bucket. Due to the escape, even though at a slow rate, of air (and some steam) from within the trap bucket, through the leak groove 75, and due to the condensation of steam within the bucket, the pressure of the steam and/or air within the trap bucket is constantly being reduced. In time, the pressure of said steam and/or air is reduced to such an extent that it is no longer sufficient to maintain the ball valve 69 up against its seat 70, with the result that said ball valve leaves its seat and fully opens the valve housing passageway 68. The air and some of the steam within the trap bucket immediately rush upwardly and escape from the trap bucket through the now fully open valve housing passageway 68, with the result that the steam and/or air pressure within the trap bucket almost immediately is insufficient to maintain the trap bucket in an elevated position and said bucket thereupon falls. The fall of the trap bucket, which fall is to its maximum extent, effects a complete opening of the trap outlet 31, with consequent discharge from the trap chamber 2 of an appreciable portion of the water and air therein. Inasmuch as the trap outlet is completely opened each time the trap bucket falls, and for an appreciable period, since the trap bucket falls each time its maximum extent, a substantial discharge of water and air from the trap is effected upon each fall of the bucket. The trap bucket, therefore, need not and does not fall frequently, so that the present trap is what may be termed an "intermittently operating" trap.

After each such discharge by the trap, the incoming steam entering the trap chamber 2 through the inlet conduit 4 again returns the trap bucket to its elevated position, Fig. 1, with consequent closing by the valve 35 of the trap outlet 31. In this elevated position, the trap bucket remains until sufficient air and/or steam has escaped from the trap bucket through the leak groove 75, and/or until sufficient steam within the trap bucket has condensed, to so reduce the steam and/or air pressure within the trap bucket that said pressure is no longer sufficient to maintain the ball valve 69 up against its seat 70, in closing position with respect to the valve housing passageway 68. The reduction of the steam and/or air pressure within the trap bucket to such an extent results in the opening of the valve housing passageway 68 and the falling of the trap bucket, with consequent opening of the trap outlet 31, all as before described.

While a ball valve mechanism is used in the present trap, it will, of course, be understood that other types of valve mechanism may be employed, and that other changes may be made in the present trap without departing from the spirit or the scope of the present invention.

What I claim is:

A steam trap, comprising a chambered casing having an inlet and an outlet, valve mechanism for controlling said outlet, an inverted bucket in the chamber of said casing for actuating said valve mechanism, said bucket being provided in its top wall with a vent passageway, and a valve arranged below said bucket top wall and hence below the vent passageway thereof for controlling said passageway, said valve cooperating with the lower end of said passageway, said passageway being provided at its lower end with a leak groove which said valve does not close, the movement of said valve into and out of closing position with respect to the lower end of said passageway serving to maintain said leak groove free of clogging foreign matter and hence always open.

LESLIE P. STRONG.